(12) United States Patent
Andronis

(10) Patent No.: US 6,183,011 B1
(45) Date of Patent: Feb. 6, 2001

(54) ARRANGEMENT FOR COVERING A GAP BETWEEN COMPONENTS

(75) Inventor: Odysseus Andronis, Braunschweig (DE)

(73) Assignee: Volkswagen AG, Wolfsburg (DE)

( * ) Notice: Under 35 U.S.C. 154(b), the term of this patent shall be extended for 0 days.

(21) Appl. No.: 09/206,858

(22) Filed: Dec. 8, 1998

(30) Foreign Application Priority Data

Dec. 10, 1997 (DE) .............................................. 197 54 831

(51) Int. Cl.[7] ....................................................... B62D 1/18
(52) U.S. Cl. .................................. 280/775; 180/78; 74/493
(58) Field of Search .................................. 280/775, 777; 74/493, 18; 180/78

(56) References Cited

U.S. PATENT DOCUMENTS

| 1,230,528 | * | 6/1917 | Solomon ................................. 74/493 |
| 2,079,536 | * | 5/1937 | Thurber .................................. 74/493 |
| 3,424,025 | * | 1/1969 | Harper ................................... 74/493 |
| 3,583,244 | * | 6/1971 | Telnert ..................................... 74/18 |
| 3,921,747 | * | 11/1975 | Suzuki et al. ....................... 74/492 X |
| 4,400,012 | | 8/1983 | Otsuka .................................. 280/777 |
| 4,752,085 | * | 6/1988 | Yamamoto ........................... 280/775 |
| 4,893,518 | * | 1/1990 | Matsumoto et al. ............. 280/775 X |
| 4,899,612 | | 2/1990 | Bruhnke et al. ....................... 74/493 |
| 5,052,240 | * | 10/1991 | Myoshi et al. .................... 280/775 X |
| 5,178,411 | * | 1/1993 | Fevre et al. ........................... 280/775 |
| 5,280,956 | * | 1/1994 | Tanaka et al. ........................ 280/777 |
| 5,417,452 | * | 5/1995 | Khalifa et al. ........................ 280/777 |
| 5,476,284 | * | 12/1995 | DuRocher et al. .................. 280/777 |
| 5,477,744 | * | 12/1995 | Hoblingre et al. ............... 280/775 X |
| 5,495,777 | * | 3/1996 | Schneider et al. ...................... 74/492 |
| 5,562,306 | | 10/1996 | Rispeter ............................... 280/775 |
| 5,573,273 | * | 11/1996 | Ito ........................................ 280/775 |
| 5,609,063 | * | 3/1997 | Hedderly ................................ 74/492 |
| 5,758,545 | * | 6/1998 | Fevre et al. ....................... 280/775 X |
| 5,813,289 | * | 9/1998 | Renick et al. .................... 280/775 X |
| 5,813,699 | * | 9/1998 | Donner et al. ........................ 280/775 |
| 5,819,592 | * | 10/1998 | Lewandowski et al. ............... 74/492 |

FOREIGN PATENT DOCUMENTS

| 2922425 | * | 12/1980 | (DE) . |
| 4337721 | | 2/1995 | (DE) . |
| 29502605 | | 6/1995 | (DE) . |
| 3933288A1 | * | 12/1988 | (EP) . |
| 4138583C1 | * | 4/1993 | (EP) . |
| 0661200 | | 7/1995 | (EP) . |
| 0753447 | | 1/1997 | (EP) . |
| 0838387 | | 4/1998 | (EP) . |
| 2087808 | | 6/1982 | (GB) . |

\* cited by examiner

Primary Examiner—Lanna Mai
Assistant Examiner—Ruth Ilan
(74) Attorney, Agent, or Firm—Baker Botts L.L.P.

(57) ABSTRACT

An arrangement is proposed for covering the gap in an opening between a dashboard and a steering column, which is displaceable in different directions. Additionally provided is a casing part enclosing the steering column, to which is hinged a structural part serving to cover the gap, the structural part serving to cover the gap being held on the dashboard by a spring element. According to the invention, the casing part and the structural part serving to cover the gap are brought together to form a substantially circular outer contour, making for a highly compact and space-saving design of the arrangement.

17 Claims, 5 Drawing Sheets

ARRANGEMENT FOR COVERING A GAP BETWEEN COMPONENTS

BACKGROUND OF THE INVENTION

The invention relates to an arrangement for covering a gap in an opening between a dashboard and a steering column that is displaceable in different directions, comprising a casing part, substantially enclosing the steering column, to which is hinged a structural part serving to cover the gap, the structural part serving to cover the gap being held against the dashboard by at least one spring element.

A generic arrangement for covering a gap is disclosed in DE 295 02 605 U1. There, a platelike rigid structural part is used for covering the gap. This arrangement is bulky and comparatively complicated in design.

SUMMARY OF THE INVENTION

Starting out from said prior art, a generic arrangement is sought which may be used to save space and is comparatively simple in design.

With the features described herein, the invention provides such an arrangement. It is proposed, according to the invention, that the casing part and the structural part serving to cover the gap can be brought together to form a substantially circular outer contour. Therefore, the arrangement for covering the gap according to the invention can be used in space-saving fashion even in conditions of limited space (e.g., in small cars). The design may be kept comparatively simple structurally. In addition, a visually attractive general impression can be obtained.

An advantageous design of the invention provides that the structural part serving to cover the gap is hinged in the end region of the casing part toward the steering wheel, at its upper side. In this way, the structural part serving to cover the gap may be designed as a rigid part, thus simplifying its structure. Hinging of the said structural part to the limiting wall of the opening and simultaneously to the casing part would alternatively be possible. When the steering column is moved axially, the said structural part would then have to be flexible in length, because the distance between the two hinge points changes.

The flexible element may advantageously be designed in the form of a leaf spring, thus permitting great spring-supported movement of the structural part serving to cover the gap in simple fashion. However, a design resembling an especially sturdy leaf spring is alternatively possible.

Making the casing part in one piece provides stability to the arrangement. In addition, the likelihood of noise caused by parts moving against one another is reduced. However, it may alternatively be advantageous for the casing part to consist of an upper part and a lower part. Then the upper and lower parts may be locked together. This simplifies assembly of the arrangement according to the invention.

According to another advantageous embodiment of the invention, when the casing part, in its lower side region, is provided with an opening for at least partial accommodation of a device for locking the steering column, the locking device can be arranged compactly and readily accessible. When the locking device, in the region of the opening, at the same time is advantageously substantially adapted to the outer contour of the casing part, optimal integration of the locking device in the arrangement is effected. Then it is advisable to provide that in the longitudinal extension of the casing part the length of the opening be sized so that longitudinal displacement of the casing part is not hindered by the locking device. In an especially advantageous refinement of the invention, the locking device comprises a cam, whereby reliable locking of the steering column is obtained in simple fashion.

According to another advantageous development of the invention, the casing part has a front opening that serves for the accommodation of a steering wheel-side shoulder on the steering column.

Simple and advantageous hinging of the structural part serving to cover the gap to the casing part is effected by a snap-in connection.

The casing part advantageously is provided with at least one supporting member acting transverse to the steering column. Then the supporting means may be designed in the form of a sleevelike yielding element. This makes for good radial and yet readily flexible support of the casing part. In the event of inadvertent displacement motions of the steering column, damage to the casing part is therefore avoided.

The structural part serving to cover the gap advantageously is designed roughly semicircular in cross section. At the same time, it is advantageous when the casing part, in the region of its upper end, has an outer surface set back radially inward. The casing part and the structural part serving to cover the gap can therefore be supplemented in simple fashion to make a circular outer contour, so that suitable supporting surfaces are obtained.

BRIEF DESCRIPTION OF THE DRAWINGS

The invention is now to be explained in detail by means of a preferred example and the accompanying figures, wherein.

DESCRIPTION OF PREFERRED EMBODIMENTS

Figure 1:
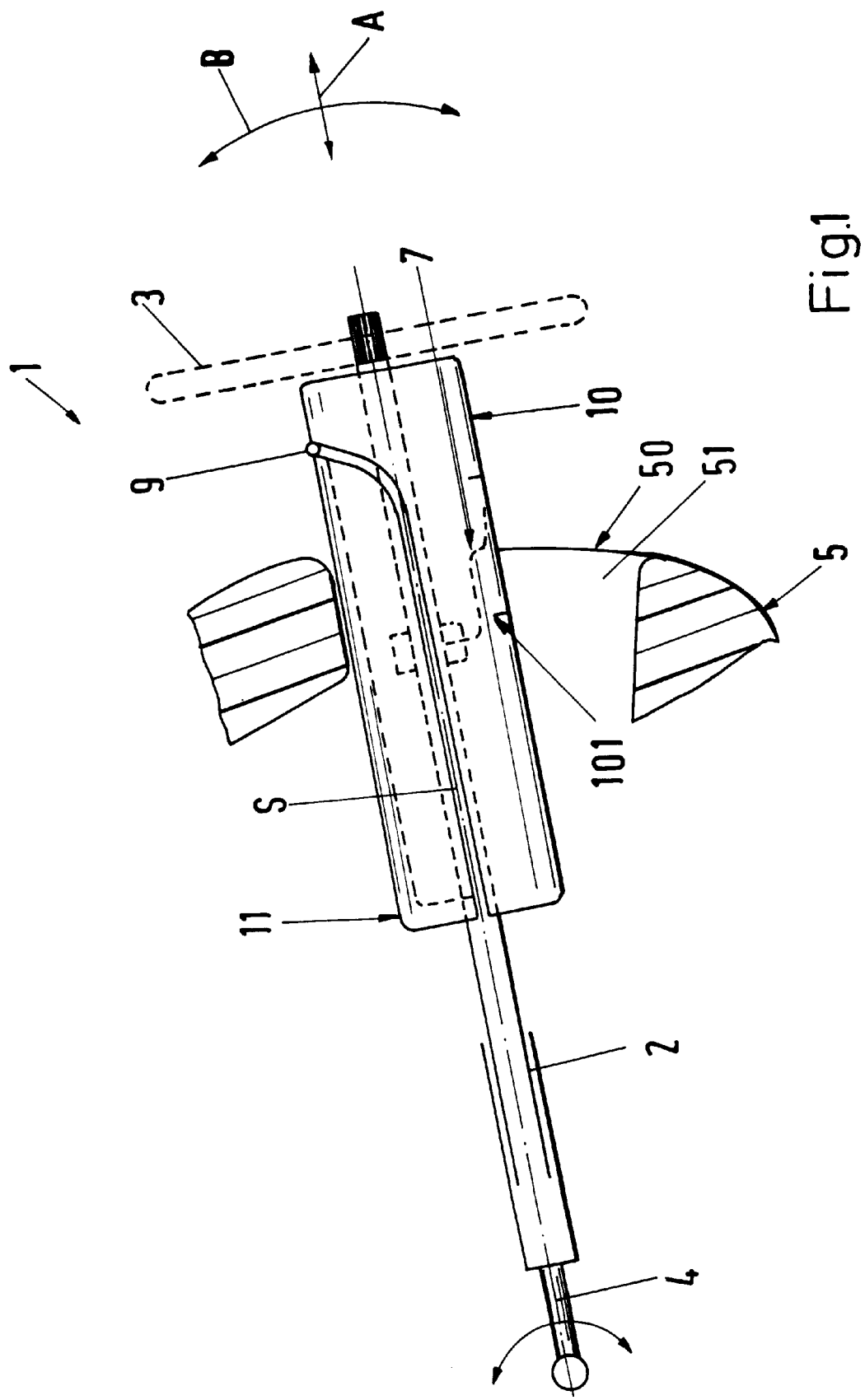
FIG. 1 is a basic view, partially in section, of the invention from the side, in an upper position of the steering column, where only the essential elements are represented.
Figure 2:
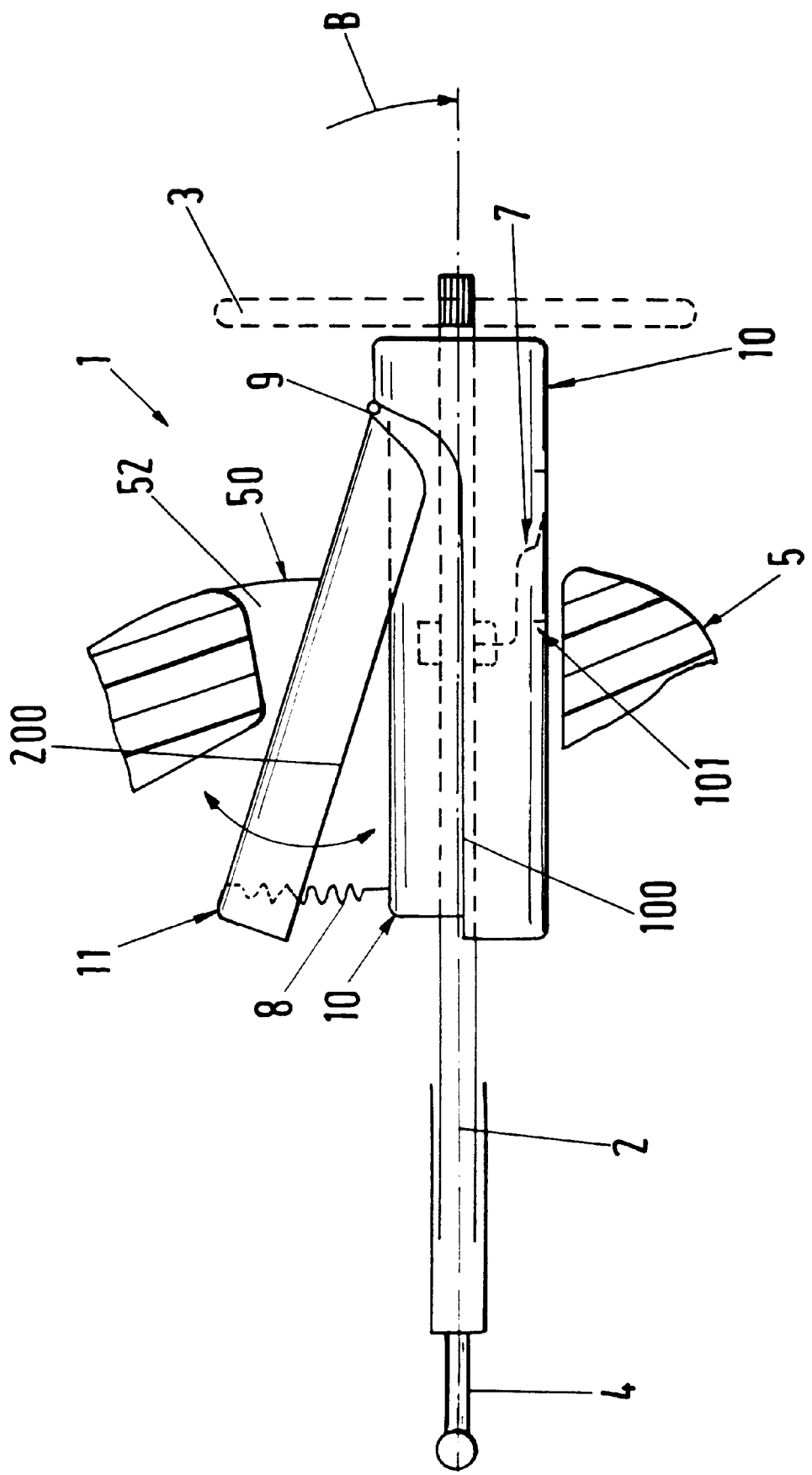
FIG. 2 is a view of the invention according to FIG. 1, but in a position of the steering column moved downward.
Figure 3:
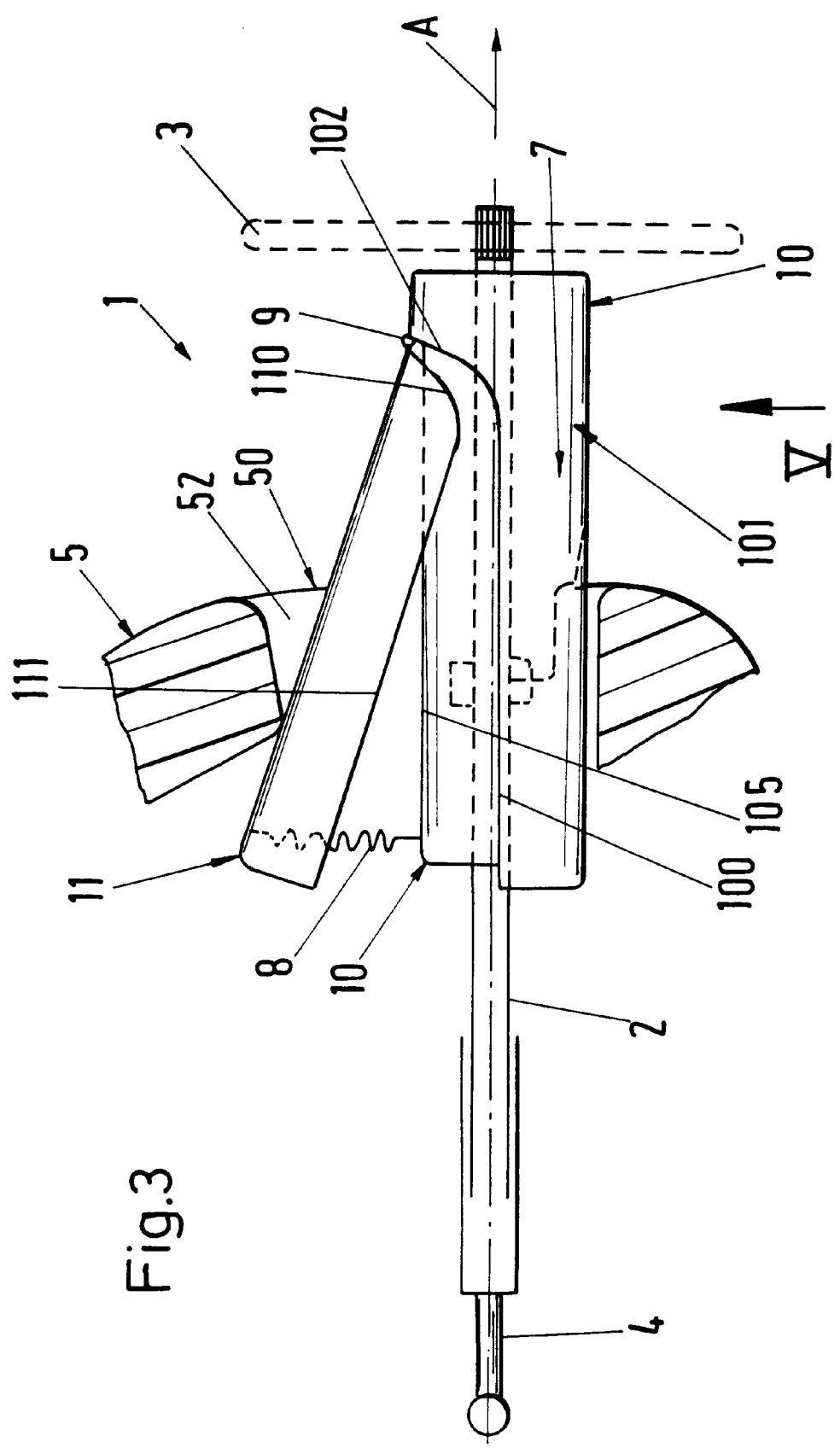
FIG. 3 is a view of the invention according to FIG. 2, but with the steering column moved out in the direction of the steering wheel.

Reference is first made to FIGS. 1 to 3. Visible there is an arrangement 1 according to the invention, which serves for covering the gap in an opening 50 between a dashboard 5 and a steering column 2, which is displaceable in different directions A, B (cf. arrows). This, of course, presupposes appropriately sized dimensions of the opening 50. In addition, the arrangement 1 comprises a casing part 10 substantially enclosing the steering column 2. A covering part 11 is coupled to the casing part 10 by a hinge joint 9. In a manner not represented in detail, the casing part 10 is connected immovable with the steering column 2 and projects together with the cover part 11 through the opening 50 of the dashboard 5. At the end of the steering column 2 on the driver's side, a steering wheel 3, shown in broken lines, is mounted fixed against rotation and displacement, so that changes of position of the steering wheel 3 in the directions A (pulling or pushing) and/or B (shifting up or down) are transmitted to the steering column 2. For the purpose of movability of the steering column 2 in the direction of its longitudinal axis, the latter, as indicated, is held axially displaceable in a coupling element 4 designed for example as a hollow profile and connected movable with a steering gear, not represented. A locking device 7, shown in broken lines, is provided for fixing the steering column position.

In an upper position of the steering column 2 of FIG. 1, the cover part 11 lies on the casing part 10 and only a barely visible gap S remains between these parts. In this position, the casing part 10 and the cover part 11 are brought together into a substantially circular outer contour, this contour remaining roughly the same over the length of the parts 10, 11. Accordingly, the casing part 10 and the cover part 11 in the brought-together state assume an approximately cylindrical shape overall. This makes for a highly compact and space-saving design of the arrangement and in addition contributes to easy displaceability of the steering column 2. Additionally, a visually attractive image is produced.

Further, it can be seen in FIG. 1 that, in the position shown of the steering column 2, in the region of the opening 50 only a lower gap 51 is produced below the casing part 10. However, this gap 51 is not so susceptible to the penetration of dirt, dust or the like and also is not visually accessible to the field of vision of the driver of a vehicle. No noticeable gap is present above the casing part 10 and/or the cover part 11, since the cover part 11 lies essentially against the dashboard 5.

In FIG. 2, the steering column 2 has been swung into a lower position (direction B) by means of the steering wheel 3. It can be seen that this results in an upper gap 52 above the casing part 10 in the region of the opening 50. This gap 52 is substantially more susceptible to the penetration of dust, dirt or the like and in addition is located within the driver's angle of vision. To cover this gap 52, the cover part 11 is provided, which by means of a helical spring 8 is capable of swinging about the hinge joint 9 (cf. arrow) and is pressed against the dashboard 5. Therefore, the free passage through the gap 52 is concealed.

In FIG. 3, the steering column 2 is still in the lower position, but the steering column 2 is pulled out by means of the steering wheel 3 in the direction of the steering wheel 3 and/or the interior of the vehicle (direction A). In this drawn-out position, the upper gap 52 is still concealed by the cover part 11 in the same way as in FIG. 2. The length of the cover part 11 must, of course, be sized so that it still projects into the opening 50 even in case of maximum possible pullout of the steering column 2. Reliable covering of the gap in any position of the steering column 2 with the simple design of the cover part 11 is obtained in that the cover part 11 is hinged (hinge joint 9) to the upper side of the casing part 10, specifically in the region of the end of the casing part 10 pointing toward the steering wheel 3, and the end region of the cover part 11 facing the hinge joint 9 is pressed upward against the dashboard 5 by the spring element 8. The use of another spring element, for example of a leaf spring type, is alternatively possible. However, a spiral spring permits long spring paths and hence a wider spring-supported swing range of the cover part 11 is easily obtained.

In addition it can be seen in FIG. 3 that the upper region of the casing part 10 away from the hinge joint 9 has a radially set-back surface, which extends as far as the end of the casing part 10. This results in a shoulderlike clearance space for the cover part 11. Upon coming together with the casing part 10, the cover part 11 is able, by means of special supporting surfaces 110, 111, to support itself on resulting supporting surfaces 100, 102 of the casing part 10. Starting from the hinge joint 9, the casing part 10 has the supporting surface 102, which is designed curved downward and turns into the horizontal supporting surface 100. The supporting surface 110 of the cover part 11 is designed correspondingly curved and corresponds with the supporting surface 102, the supporting surface 110 correspondingly turning into the horizontal supporting surface 111, which in turn corresponds with the supporting surface 100. The surfaces 102, 110 and 100, 111 together form the gap S.

Figure 4:
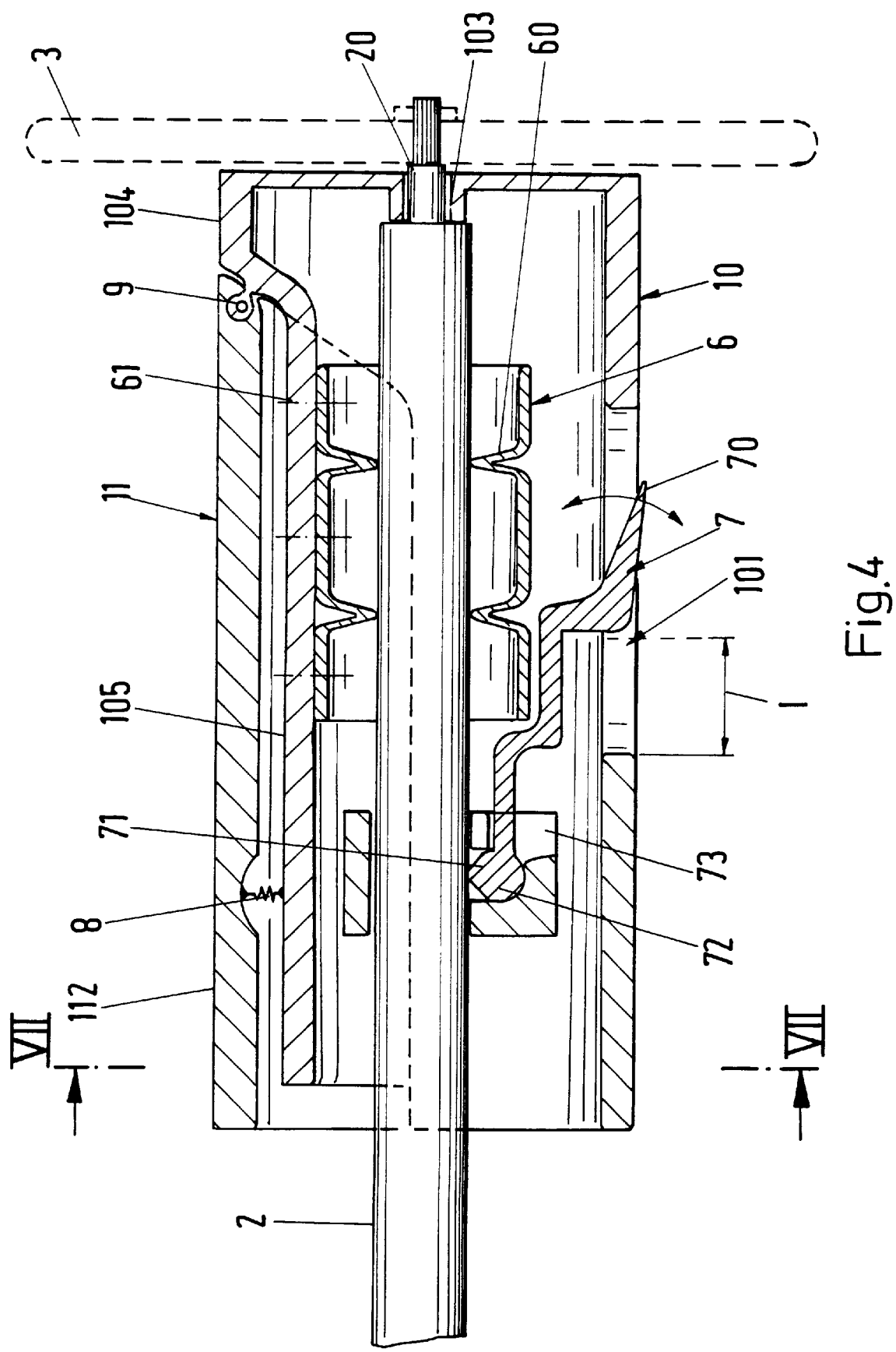
FIG. 4 is a detail view of the casing part and the structural part serving to cover the gap in the brought-together state, in longitudinal section.

FIG. 4 shows a detail view of the cover part 11 and the casing part 10 in the longitudinal direction and in the brought-together state of the two parts. There, the upper outer surface of the casing part 10 in the steering-wheel region, not covered by the cover part 11, is labeled 104, and the outer surface of the cover part is labeled 112. It can be seen that the outer surfaces 104 and 112 are roughly in alignment. In addition, the outer surface 105, set back radially inward and located in the upper region of the casing part 10, which is covered by the cover part 11, is visible. The hinge joint 9 may be made snapped-in or alternatively by means of a hole/pin connection. The spring element 8 preferably is mounted flexibly by its spring ends in each instance between the cover part 11 and the casing part 10, in order to achieve the angular clearance resulting from swinging up of the cover part 11.

As becomes clear, in addition, the casing part 10 has a substantially boxlike shape whose one face is open. The other face is provided with an approximately centrally aligned sleeve-like opening 103, which when the casing part 10 slips up on the steering column 2 serves to accommodate a steering column shoulder 20. The casing part 10 can easily be fixed axially by means of the opening 103 and the steering column shoulder 20. Some radial support is also given in this region. For reliable radial support, however, an additional supporting member 6, for example in the form of a sleevelike spring element, should be provided. This may be fastened by means of connecting elements 61, not represented in detail, on the inner wall of the casing part 10. For better accessibility, recesses in the casing part 10, not illustrated, as well as in the supporting member 6, are possible. The supporting member 6 has constrictions 60, directed radially inward, whose inside diameter is sized so that a fixed yet displaceable seat on the steering column 2 is ensured.

Figure 5:
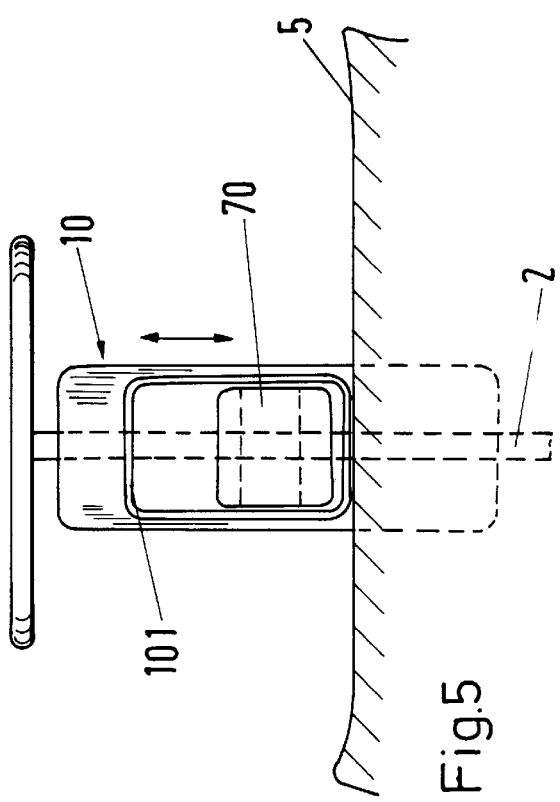
FIG. 5 is a basic representation of the invention of FIG. 3 from below.

The locking device 7 comprises a locking lever 70, by which a cam 71 can be made to clamp on the steering column 2. The cam 71 is seated in a housing 72, through which the steering column 2 is passed and which serves as a bearing surface for the cam 71. For releasing the connection, the locking lever 70 is swung downward and, for tightening it, is swung upward (cf. double arrow), the movability of the locking lever 70 in the housing 72 being ensured by an opening 73. The locking lever 70 is accessible from the underside of the casing part 10 through an aperture 101. The aperture 101 has an approximately rectangular shape in its projected surface and, in its length, viewed in the direction of displacement of the steering column, is sized so that a maximum displacement path I of the steering column 2 or of the casing part 10 is made possible without hindrance by the locking lever 70. In this connection, it is to be noted that the locking lever 70, in the region of the aperture 101, is substantially adapted to the outer contour of the casing part 10 (cf. FIGS. 4 and 5).

Figure 6:
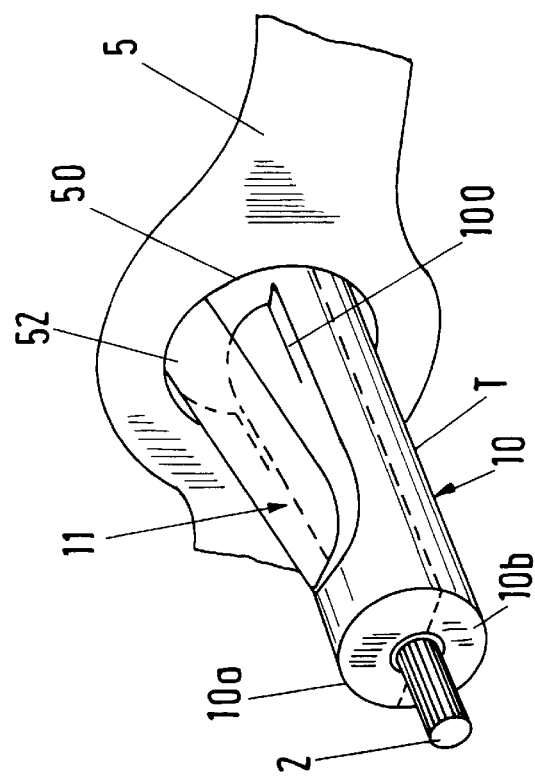
FIG. 6 is a perspective basic representation of the invention, where the steering wheel is not shown.
Figure 7:
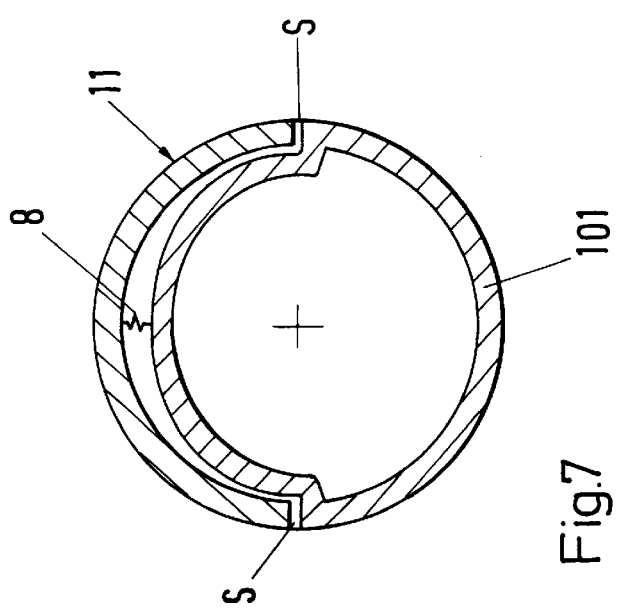
FIG. 7 is a cross section along section VII in FIG. 4, without steering column and locking means.

FIG. 6 again shows a basic view in perspective of the arrangement according to the invention, where the dashboard 5 is indicated. In the position shown, which corresponds approximately to that of FIGS. 2 and/or 3, the upper gap 52 resulting in the region of the opening 50 becomes active and is visually inconspicuously covered. To facilitate assembly, the casing part 10, as indicated in broken lines, may alternatively consist of an upper part 10a and a lower part 10b, which are held together in the form of a snap-in connection. It is clear that when the casing part 10 and the cover part 11 are brought together, a substantially cylindrical outer shape or circular outer contour is be produced, and this is also shown by FIG. 7, which shows the brought-together state in cross section. Then, the cover part 11 has an approximately semicircular shape in cross section. Only the contour-determining parts are represented there.

The contour-determining parts preferably are made of synthetic material in the injection molding process.

Let it be noted that FIGS. 1 to 7 are not to scale, but serve only to illustrate the essential features of the invention.

What is claimed is:

1. An arrangement for covering a gap in an opening between a dashboard and a steering column that is displaceable in different directions comprising a casing part substantially enclosing the steering column and a rigid hinged structural part serving to cover the gap, the structural part serving to cover the gap being held against the dashboard by at least one spring element wherein the casing part and the structural part serving to cover the gap can be brought together to form a substantially circular outer contour.

2. An arrangement according to claim 1 wherein the structural part serving to cover the gap is hinged to an upper side of an end region of the casing part toward a steering wheel.

3. An arrangement according to claim 1 wherein the spring element is a helical spring.

4. An arrangement according to claim 1 wherein the spring element is a leaf spring.

5. An arrangement according to claim 1 wherein the casing part is in one piece.

6. An arrangement (1) according to claim 1 wherein the casing part comprises an upper part and a lower part.

7. An arrangement according to claim 6 wherein the upper and the lower parts are connected by being snapped into each other.

8. An arrangement according to claim 1 wherein the casing part has an aperture on a lower side for at least partial accommodation of a locking means for the steering column.

9. An arrangement according to claim 8 wherein the locking means is located in the region of the aperture and substantially conforms to the outer contour of the casing part.

10. An arrangement according to claim 8 wherein the length of the aperture in a longitudinal direction of the casing part is sized so that longitudinal displacement of the casing part is not hindered by the locking means.

11. An arrangement according to claim 8 wherein the locking means comprises a cam.

12. An arrangement according to claim 1 wherein the casing part has a front opening, which serves to accommodate a shoulder of the steering column facing a steering wheel.

13. An arrangement according to claim 1 wherein the hinged structural part serving to cover the gap on the casing part has a hinge joint effected by a snap-in connection.

14. An arrangement according to claim 1 including at least one supporting means for the casing part acting transversely to the steering column.

15. An arrangement according to claim 14 wherein the supporting means is a spring element.

16. An arrangement according to claim 1 wherein the structural part serving to cover the gap is approximately semicircular in cross section.

17. An arrangement according to claim 1 wherein an upper side of the casing part has an outer surface which is recessed inwardly.

* * * * *